(12) United States Patent
Lyapustina et al.

(10) Patent No.: US 6,802,059 B1
(45) Date of Patent: Oct. 5, 2004

(54) TRANSFORMING CHARACTER STRINGS THAT ARE CONTAINED IN A UNIT OF COMPUTER PROGRAM CODE

(75) Inventors: Yevgeniya Lyapustina, La Selva Beach, CA (US); Tetsuro Motoyama, Cupertino, CA (US)

(73) Assignee: Ricoh Corporation, San Jose, CA (US)

( * ) Notice: Subject to any disclaimer, the term of this patent is extended or adjusted under 35 U.S.C. 154(b) by 0 days.

(21) Appl. No.: 09/366,429

(22) Filed: Aug. 2, 1999

(51) Int. Cl.$^7$ .............................................. G06F 9/45
(52) U.S. Cl. .................... 717/143; 717/112; 717/117; 717/142
(58) Field of Search ................. 717/106–119, 136–147; 712/300, 226–227, 242–243

(56) References Cited

U.S. PATENT DOCUMENTS

| | | | | |
|---|---|---|---|---|
| 5,495,613 A | * | 2/1996 | Brody | 717/110 |
| 5,511,159 A | * | 4/1996 | Baker et al. | 345/700 |
| 5,778,371 A | * | 7/1998 | Fujihara | 707/100 |
| 6,321,372 B1 | * | 11/2001 | Poirier et al. | 717/122 |

OTHER PUBLICATIONS

Wagner, "On the complexity of the Extended String-to-String Correction Problem", Proceedings of seventh annual ACM symposium on Theory of computing, pp: 218–223, May 1975.*

Ogawa et al., "Simple word strings as compound keywords: an indexing and ranking method for Japanese texts", ACM, pp: 227–236, Jul. 93.*

* cited by examiner

*Primary Examiner*—Wei Y. Zhen
*Assistant Examiner*—Ted T. Vo
(74) *Attorney, Agent, or Firm*—Hickman Palermo Truong & Becker LLP; Edward A. Becker

(57) ABSTRACT

A method and apparatus for transforming character strings that are contained in a unit of code. A conversion mechanism performs a macro substitution by transforming hard coded strings into unique macro strings. The conversion mechanism is configured to receive a set of computer instructions that are contained in one or more files. The conversion mechanism parses the instructions to identify character strings included within the computer instructions, while copying the files to one or more output source code files. Upon identifying each string, the conversion mechanism generates a unique macro string as a substitute for the original string. The conversion mechanism then substitutes the unique macro string for the identified string in the source code of the computer program. The conversion mechanism also generates an entry in a macro list that associates the unique macro string with the identified string for use during compilation of the computer instructions. A reference to the macro list is stored in each of the output source code files. When a compiler compiles the output source code files, the compiler may read the macro list and substitute each instance of the unique macro string with its associated identified string.

18 Claims, 10 Drawing Sheets

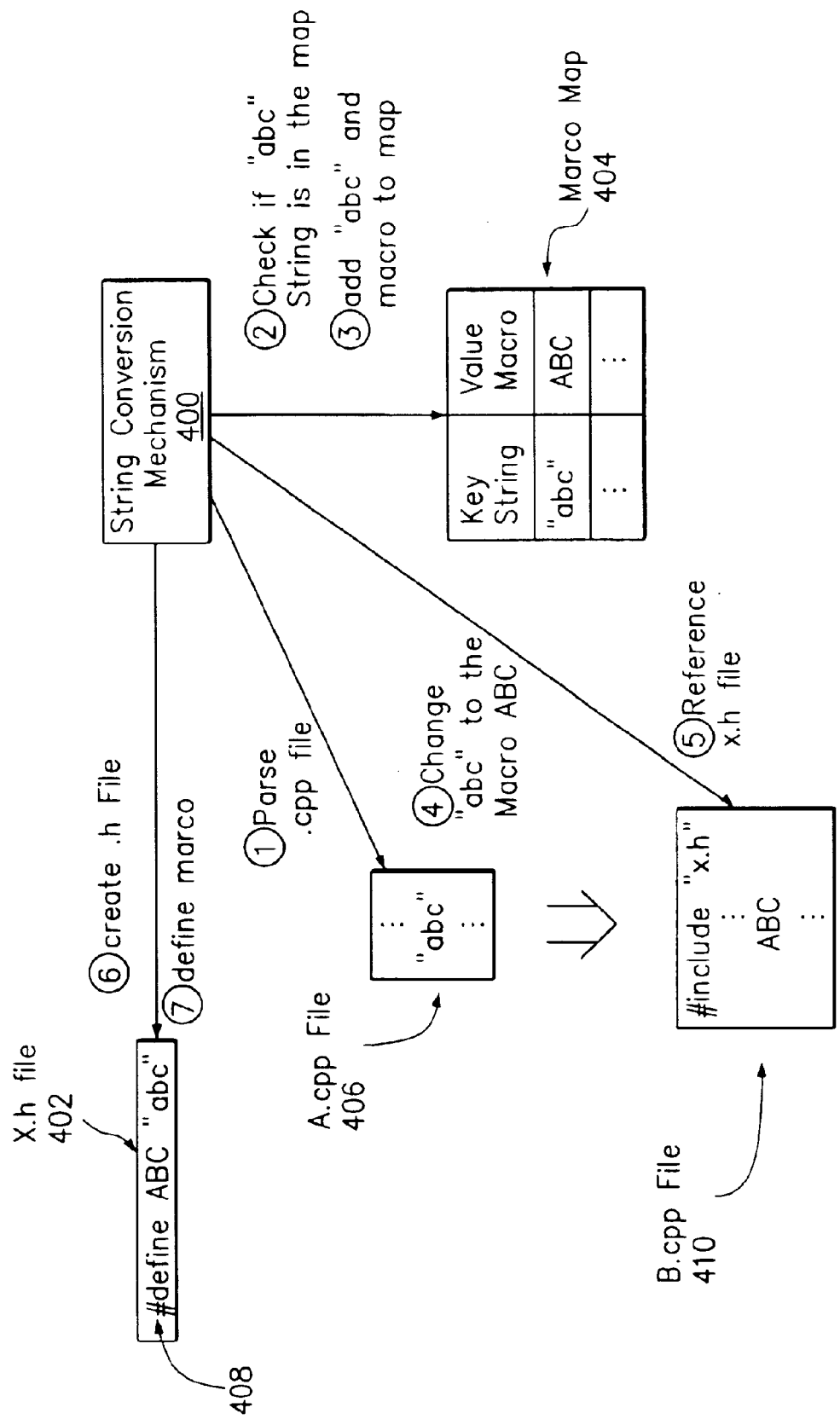

FIG. 5

| String Conversion System | 500 |
|---|---|
| Parser Module<br>Functions:<br>  1. Parses the .cpp file:<br>     -gets Tokens from the file;<br>     -ignores #include statements and comments.<br>  2. Creates Macro for the string token.<br>  3. Passes string and the macro to the Macro Map, cpp File Manager, h File Manager<br><br>Attributes:<br>  Source code file list<br><br>Classes:<br>  Scanner, Token, Parser<br>502 | Source Code File Manager Module<br>Functions:<br>  1. Opens .cpp file.<br>  2. Reads the file and passes chars to the Parser<br>  3. Changes string to the Macro.<br>  4. Checks for the #include statement.<br>  5. Includes .h file if needed.<br>  6. Closes .cpp file.<br><br>Attributes:<br>  Source code file pointer<br><br>Classes:<br>  Source Code File Manager<br>504 |
| Macro Map Manager Manager Module<br>Functions:<br>  1. Checks if Macro is in the Map.<br>  2. Adds string and the Macro to the Map.<br><br>Attributes:<br>  Macro Map<br><br>Classes:<br>  Macro Map Manager<br>506 | Header File Manager Module<br>Functions:<br>  1. Creates .h file if needed.<br>  2. Defines Marco in the .h file.<br>  3. Closes the header file.<br><br>Attributes:<br>  Header file pointer;<br>  header filename.<br><br>Classes:<br>  Header File Manager<br>508 |

TRANSFORMING CHARACTER STRINGS THAT ARE CONTAINED IN A UNIT OF COMPUTER PROGRAM CODE

FIELD OF THE INVENTION

The present invention generally relates to computer programming, including substitution of character strings. The invention relates more specifically to transforming character strings that are contained in a unit of code.

BACKGROUND OF THE INVENTION

In general, computer programs or software applications include some sort of user interface mechanism that allows a user to interact with the software application. Many software applications include a graphical user interface (GUI), such as a menu interface system, which enhances the user's ability to interact with the application software. For example, a user of a bank teller machine typically is presented with several different menu interface windows. Each menu generally includes one or more options that allow the user to enter information and to perform a particular transaction.

To provide a more "user-friendly" program, a graphical user interface generally includes visual information that describes the different options that may be performed through the user interface. In this context, visual information includes any set of characters or symbols that have been combined in a particular manner to present certain information to the user. For example, a menu interface for a bank teller machine may include the visual information "ENTER YOUR PIN NUMBER" to inform the user to first enter a personal identification number (PIN) to access their account. Alternatively, a window for a word processing application may include a menu interface that contains the visual information "File", "Edit", "View" and "Format" to inform the user that certain pull-down menus are available for manipulating the contents of a document.

In general, visual information in a user interface is based on the symbols and language that is most familiar to the typical end user. For example, if a bank teller machine is located in the United States, the user interface typically will include visual information that is in English. Alternatively, if a bank teller machine is located in Germany, the user interface will include visual information that is in German.

One approach for generating a user interface that includes visual information is by "hard coding" character strings throughout the computer program code that generates the user interface. A character string or "string" is a sequence of alphanumeric characters. In many computer programming languages, strings may be stored in discrete named storage locations that may be manipulated as a unit, or may be inserted literally in expressions that are defined, in the grammar of the language, as capable of receiving string parameters. As an example, to generate a user interface that requests a user to enter a username and password when attempting to access an application program, the string "Enter your Username and Password" may be hard coded into a display routine of the user interface code. To generate a user interface that includes an accept and a reject button on a user interface, the strings "ACCEPT" and "REJECT" may be hard coded into the user interface code.

The hard coding approach has a significant disadvantage; it is inflexible. Changing visual information requires changing the source code of the program that generates the visual information, recompiling it, and re-deploying it to end users. Errors are easily introduced in this process. Unfortunately, hard coding has been used in many software applications that are currently in use. Some applications include thousands or millions of lines of code. As a result, a significant problem with software applications that include hard coded character strings is that a huge amount of time and resources may be required to update or modify the user interface.

For example, if the application includes hard coded character strings throughout the code that provide a user interface in which the visual information is in Japanese, a significant amount of time and resources will be required to convert the visual information to English. In particular, because a string may contain any combination or number of Japanese characters, to convert the user interface to English, a software developer generally must manually search each file to locate each hard coded string. Upon locating each string, the developer must then manually convert the string to English. Once the developer has identified and translated all of the strings, the code must be recompiled and relinked to generate a new executable program.

However, to verify that all of the hard coded strings were properly translated, after building the new executable, the developer must physically view each interface to verify the strings were correctly translated to English. In addition, if the developer determines that a string was not properly translated, the developer must repeat this process to locate the string and to generate a new executable. In a program that has hundreds of different menus that are linked together, it can be extremely difficult for the developer to view and verify each and every interface that may be presented to an end user.

Translation of foreign language content is not the only problem that may arise in a computer program having hard-coded character strings. Any change in the content of the character strings requires a similar, time-consuming revision process that may result in the introduction of new errors.

Consistency is another issue. When a computer program uses the same message in the form of several hard coded strings that are used in different parts of the program, a programmer may revise one string without revising other strings that represent other instances of the same message. As a result, the program will produce inconsistent output.

Based on the foregoing, there is a need for a method or mechanism that can automatically translate hard coded visual information from one language to another.

There is also a need for a method or mechanism that can address the known disadvantages of using hard coded strings in computer programs.

SUMMARY OF THE INVENTION

The foregoing needs and objects, and other needs and objects that will become apparent from the following disclosure, are fulfilled by the present invention, which comprises, in one aspect, a method for transforming character strings that are contained in a unit of code, the method comprising the steps of identifying a hard coded string that is contained in the computer program; replacing the string with a macro that is uniquely associated with the string; creating and storing an entry in a mapping that defines an association of the macro and the string; and referencing the mapping in a program element that is associated with the computer program.

According to another feature of this aspect, the step of identifying a string further comprises the steps of identifying one or more computer programs that contain one or more hard coded strings; and parsing one of the computer programs to identify the hard coded strings while copying instructions from the one of the computer programs to an output.

In yet another feature of this aspect, the step of identifying a string further includes the steps of parsing a computer program to locate hard coded strings contained therein; and in response to locating a string, determining whether a macro was previously generated for the string; and generating a corresponding macro uniquely associated with the string only when a macro was not previously generated.

According to another feature, the method further comprises the step of compiling the computer program to generate an executable, including substituting the string in the executable for each instance of the unique macro string in the computer program.

According to yet another feature, the method further comprises the steps of parsing a computer program to locate hard coded strings contained therein; creating and storing a mapping of macros to strings characters; in response to locating a string, determining whether a macro was previously generated for the string by searching the mapping; and generating a corresponding macro uniquely associated with the string only when a macro was not previously generated.

In other aspects, the invention encompasses a computer apparatus and a computer-readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 a block diagram depicting a general processing sequence for substituting a strings with a unique macro string;

FIG. 5 illustrates a block diagram of a string conversion system that can be used to implement the invention;

DETAILED DESCRIPTION OF THE PREFERRED EMBODIMENT

A method and apparatus for transforming strings within a computer program is described. In the following description, for the purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention.

Overview

A conversion mechanism is provided for inserting a particular body of text at various places within a program file. In one embodiment, the conversion mechanism performs a macro substitution by transforming hard coded strings into unique macro strings. To perform the macro substitution, the conversion mechanism is configured to receive a set of computer instructions that are contained in one or more files. In response to receiving the instructions, the conversion mechanism parses the instructions to identify character strings that have been included within the computer instructions. Upon identifying each string, the conversion mechanism generates a unique macro string as a substitute for the original string. The conversion mechanism then substitutes the unique macro string for the identified string in the source code of the computer program.

The conversion mechanism also generates an entry in a macro list that associates the unique macro string with the identified string for use during compilation of the computer instructions. For each file that includes instructions in which a unique macro string is substituted for an identified string, the conversion mechanism includes a reference to the macro list. At compilation time, a compiler may read the macro list and substitute each instance of the unique macro string with its associated identified string.

Details of an Embodiment

For explanation purposes only, embodiments of the invention shall be described with respect to transforming strings contained in a set of computer instructions that are based on the "C++" programming language. However, as will be evident in the foregoing descriptions, embodiments of the invention are not limited to any particular programming language. For example, embodiments of the invention may be practiced using any programming language that supports hard coded strings and macros, such as "C".

Figure 1:
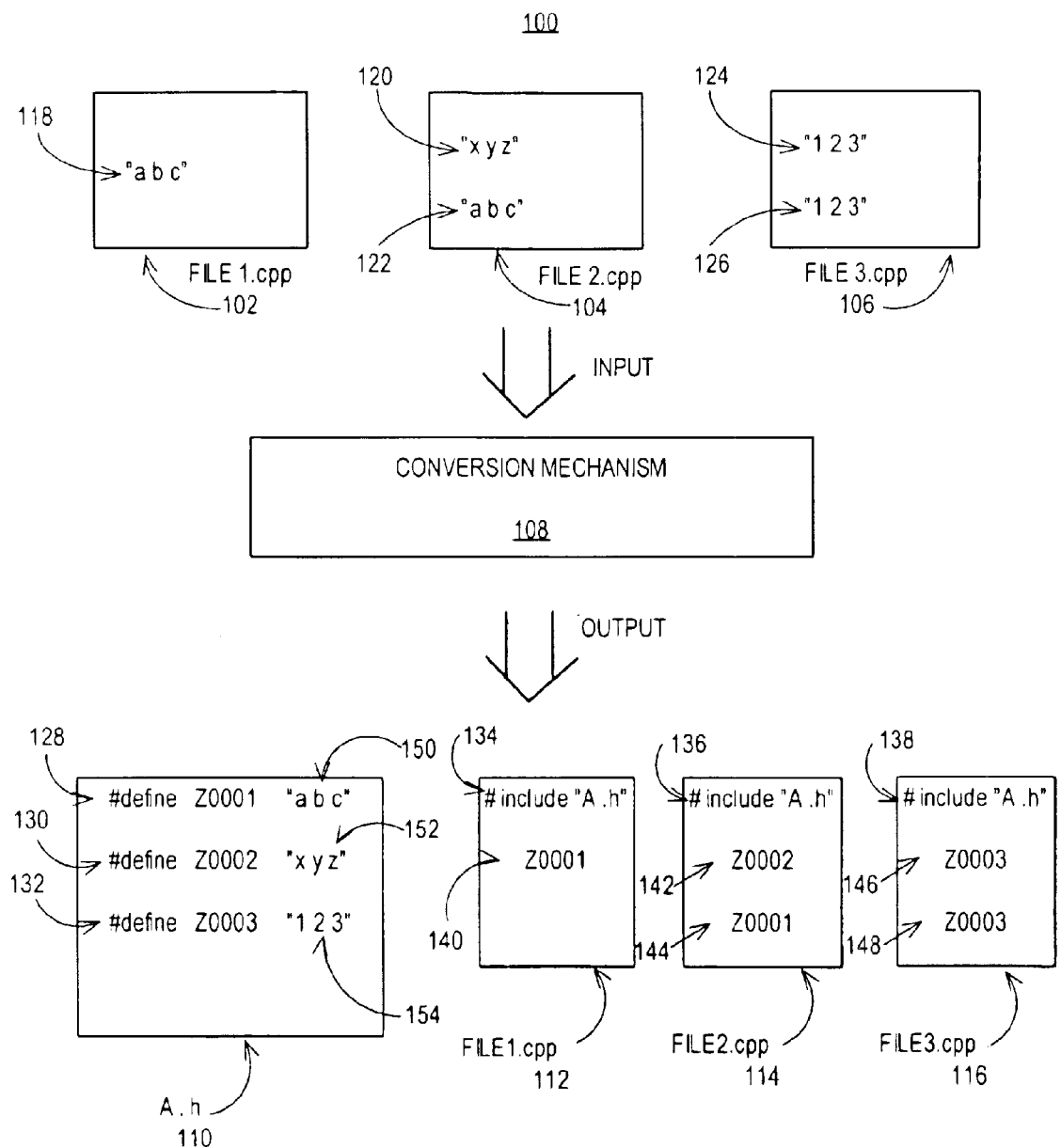
FIG. 1 is a block diagram of a document processing system in which the invention may be utilized.

FIG. 1 is a block diagram of a string transformation system 100 in which the invention can be used. Generally, the system 100 includes one or more input files 102, 104, 106, a conversion mechanism 108, a macro list 110 and one or more output files 112, 114, 116.

Each of the input files 102, 104, 106 contains computer program source code. Generally the name of an input file corresponds to the computer programming language in which the source code of the file is written. Thus, input files 102, 104, 106 may be named, respectively, as C++ files FILE1.cpp, FILE2.cpp and FILE3.cpp. In this example, input file 102 contains a set of computer instructions that include a hard coded string 118 having the value "abc". Input file 104 contains computer program code that includes strings 120 ("xyz") and 122 ("abc"). Input file 106 contains code that includes strings 124 ("123") and 126 ("123").

For explanation purposes, input files 102, 104, 106 may be assumed to comprise modules or parts of the same computer program, and therefore input files 102, 104, 106 collectively are called "a unit of code" or in the alternative "a code unit." For clarity, three input files 102, 104, 106 are depicted only with one or two examples of string expressions. There may be any number of input files. Each input file may have any number of instructions, lines of code, and string expressions. In one embodiment, input files 102, 104, 106 are received by conversion mechanism 108 for processing. In response to receiving the input files, conversion mechanism 108 parses each file to identify any strings that are contained within the instruction of each file. The conversion mechanism 108 carries out such parsing based on stored information that defines how strings are expressed in the grammar of the source computer language of input files 102, 104, 106. In certain embodiments, the conversion mechanism identifies strings as those groups of one or more characters that are bracketed by double quote characters. For example, in parsing input file 102, conversion mechanism 108 identifies string 118 ("abc") as a character string. Likewise, in parsing input file 104, conversion mechanism 108 identifies strings 120 ("xyz"), 122 ("abc") as character strings.

Embodiments of the invention are not limited to any particular string format. For example, a grammar of the programming language in which the computer instructions are expressed generally dictates the format of how strings are to be designated or delimited within the code. Thus, if a programming language uses single quotes (' ') or dashes (——) as delimiters or to designate strings, in parsing the input files the conversion mechanism uses the appropriate string delimiters to identify strings within the computer instructions.

To transform the character strings 118, 120, 122, 124, 126, the conversion mechanism 108 replaces each unique character string with a corresponding unique macro string. In one embodiment, conversion mechanism 108 copies each of the input files 102, 104, 106 to a corresponding output file 112, 114, 116. While doing so, conversion mechanism 108 creates and stores a mapping table, which has entries that map a unique macro string to each distinct character string that is identified in the unit of code. For example, Table I depicts an example of a conversion mapping table that includes corresponding entries for the files of FIG. 1 and their string contents.

TABLE 1

CONVERSION MAPPING TABLE

| STRING | UNIQUE MACRO STRING |
|---|---|
| abc | Z0001 |
| xyz | Z0002 |
| 123 | Z0003 |

The conversion mapping table allows the conversion mechanism 108 to determine whether a particular string has been identified previously while parsing the unit of code. In this manner, the conversion mechanism 108 can avoid generating multiple macro strings for different occurrences of a single character string.

For example, in parsing input file 102, conversion mechanism 108 identifies string 118 as a string that needs to be transformed. In response to identifying string 118, conversion mechanism 108 queries the conversion mapping table to determine whether the string has previously been identified or parsed. If conversion mechanism 108 determines that string 118 has not been parsed previously, then the conversion mechanism generates a unique macro string (Z0001, in this example), and inserts a new entry into the conversion mapping table. As a result, the conversion mapping table maps string 118 (abc) to the unique macro string (Z0001), as depicted in Table 1. As conversion mechanism 108 copies the code containing string 118 to output file 112, the string 118 is replaced with unique macro string 140, as depicted in output file 112 of FIG. 1.

Conversely, if conversion mechanism 108 determines that a string has been parsed previously, a unique macro string is not generated and a new entry is not inserted into the conversion mapping table. For example, if input file 104 is parsed subsequent to parsing input file 102, upon identifying string 122 (abc), conversion mechanism 108 will determine that a corresponding entry for string 122 already exists in the conversion mapping table.

Thus, instead of generating a new unique macro string, the conversion mechanism 108 retrieves the previously defined macro string (Z0001) and replaces string 122 (abc) with unique macro string 144 as the code containing string 122 is copied into output file 114.

In one embodiment, a general-purpose library of generic algorithms and data structures, such as the Standard Template Library (STL), is used to maintain a mapping of identified strings to unique macro strings. STL is described in D. Musser et al., "C++ Programming with the Standard Template Library," Addison-Wesley Publishing Co., Inc., 1996.

In certain embodiments, a user may define each unique macro string that will be associated with a particular string. For example, whenever a new string is identified, a request may be sent to a display monitor, requesting a user to enter a desired macro string value. Alternatively, a request may be sent to the display monitor requesting that the user enter a desired macro string value whenever the conversion mechanism 108 begins parsing a new input file. In certain embodiments, the conversion mechanism 108 automatically appends a unique code to any macro string entered by the user to ensure that each macro string is unique. For example, if the user enters a macro string value of "ABC", the conversion mechanism 108 may append a numerically increasing string (such as "0001", "0002", "0003") to ensure that a unique macro string is generated for each distinct string that is identified in the unit of code.

In addition, each time that a unique macro string is generated, conversion mechanism 108 generates an entry in a macro list 110 that defines a macro substitution ("macro definition") for substituting unique macro string with the corresponding identified string during compilation of the code unit. The conversion mechanism 108 also inserts a reference to the macro list in each output file in which a string has been replaced by a unique macro string. The macro definitions and inserted file references allow the compiler to properly resolve and substitute each macro and identified string at compile time. In one embodiment, macro list 110 is implemented in the form of a header file that includes one or more macro definition statements. For example, when the input files 102, 104, 106 are expressed in the C++ language, each unique macro is defined by a "#define" statement that includes, as parameters, a unique macro and the corresponding identified string. In this embodiment, the file references in the output files are structured as compiler directives, such as the "#include" compiler directive that is recognized by most C++ and C compilers. The compiler directive includes, as a parameter, the name of the macro list 110.

For example, in addition to replacing string 118 with unique macro string 140 in output file 112, conversion mechanism 108 generates and inserts macro definition 128 into a macro list 110 (A.h). Conversion mechanism 108 also inserts include file reference 134 into output file 112. Thus, during compilation, the compiler will respond to the compiler directive contained in file reference 134 by loading the macro list 110, determining that macro string 140 is defined in macro list 110, and that a substitution should be made to replace unique macro string 140 with the string "abc".

As a result, a length and complicated computer program containing hard coded strings may be rapidly and efficiently modified into a program that uses flexible macro definitions for string values.

Modifying Hard Coded Strings

Previously, in order to transform hard coded strings, a programmer was required to change each occurrence of each string delimited in its double quotes. For example, referring to FIG. 1, suppose that the string "abc" needs to be changed to "abc", the string "xyz" to "xya" and the string "123" to "132". Then, five strings in three files are required to be changed. However, by implementing the current invention, only the three macros in one file need to be manually changed. By reducing the number of files that need to be changed (e.g., from thee files to one file), the amount of work that is required, and the probability of introducing unwanted errors, is significantly reduced.

For example, in parsing and processing the strings contained in input files 102, 104, 106, conversion mechanism 108 generates macro list 110 and output files 112, 114 and 116. As depicted in FIG. 1, after completing the macro string substitution, macro list 110 includes macro definition entries 128, 130, 132 for each string that was identified in input files 102, 104, 106. Because each macro definition entry defines a string substitution that is to be performed at compile time, by modifying the string for a particular entry in macro list 110, a user can easily transform any string that is displayed when executing an application based on the code unit.

Figure 2:
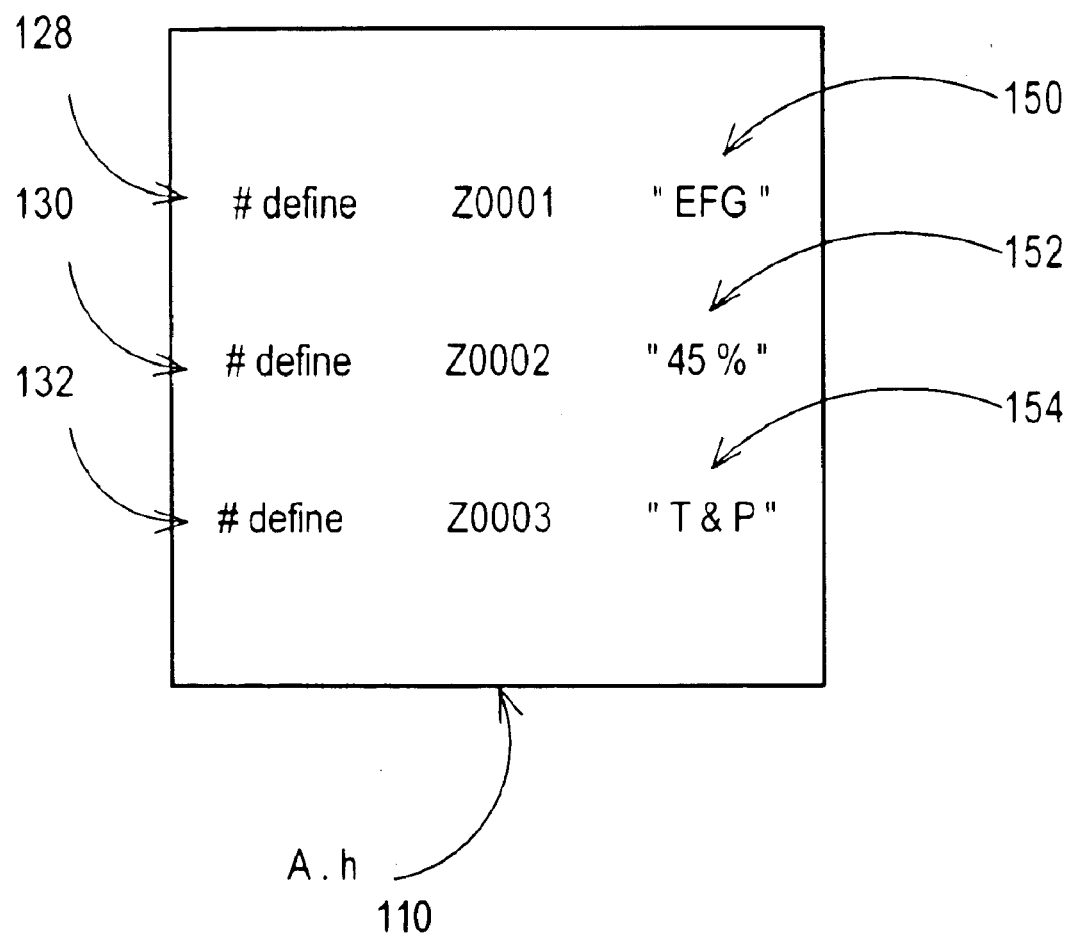
FIG. 2 is a block diagram of a header file of the system of FIG. 1 showing certain internal details.

FIG. 2 illustrates an example of macro list 110 in which string definitions 150, 152, 154 of macro definition entries 128, 130, 132 have been modified. By modifying string definitions 150, 152, 154, the user can easily cause an automatic modification of the strings that will be inserted into the corresponding object code at compile time. Thus, in executing an application based the compiled object code, the visual information that is displayed to the user will be based on the new string definitions.

Using this conversion mechanism, a user can significantly reduce the time and effort that would normally be required to translate visual information from one language to another where the user interface is defined by hard coded character strings that are defined throughout the code.

For example, assume that strings 118, 120, 122, 124, 126 contain Japanese language information. Thus, in executing an application based on input files 102, 104, 106, the visual information that is displayed to the user is presented in Japanese. However, by replacing string definitions 150, 152, 154 with an English translation of each Japanese string, the visual information that is presented to the user can be translated or converted to English without modifying source code of the computer program.

In certain embodiments, the conversion mechanism 108 is configured to automatically translate hard coded strings from one language to another. In one embodiment, the conversion mechanism 108 receives user input that defines an alternative language for which the information in each string is to be translated. For example, the conversion mechanism 108 may be configured to communicate with a database that includes table entries for translating words or strings from one language to another. Input is received requesting conversion of the strings in input files 102, 104, 106 from Japanese to English, upon identifying a string 118, the conversion mechanism 108 queries the database to determine an appropriate English translation. After receiving the English translation, the conversion mechanism inserts the English translation in string definition 150 of macro definition entry 128.

Alternatively, instead of translating string as they are identified by the conversion mechanism 108, a post translation process may be employed in which the string definitions for each macro definition entry in the macro list 110 are read and translated to the appropriate language once conversion mechanism 108 completes.

Transforming Strings Contained in a Unit of Code

Figure 3A:
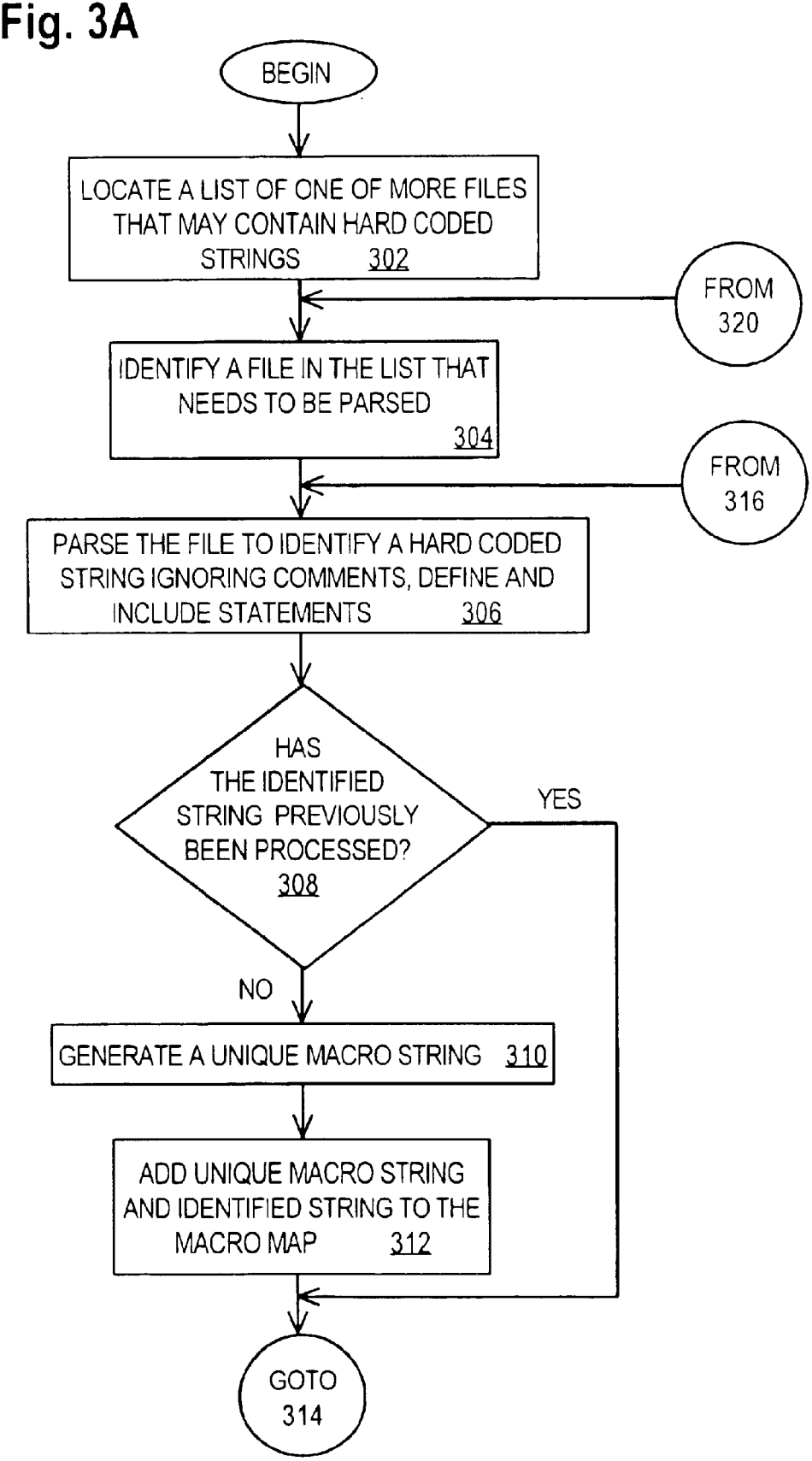
FIG. 3A is a flow diagram that illustrates a method for transforming character strings that are contained in a unit of code.
Figure 3B:
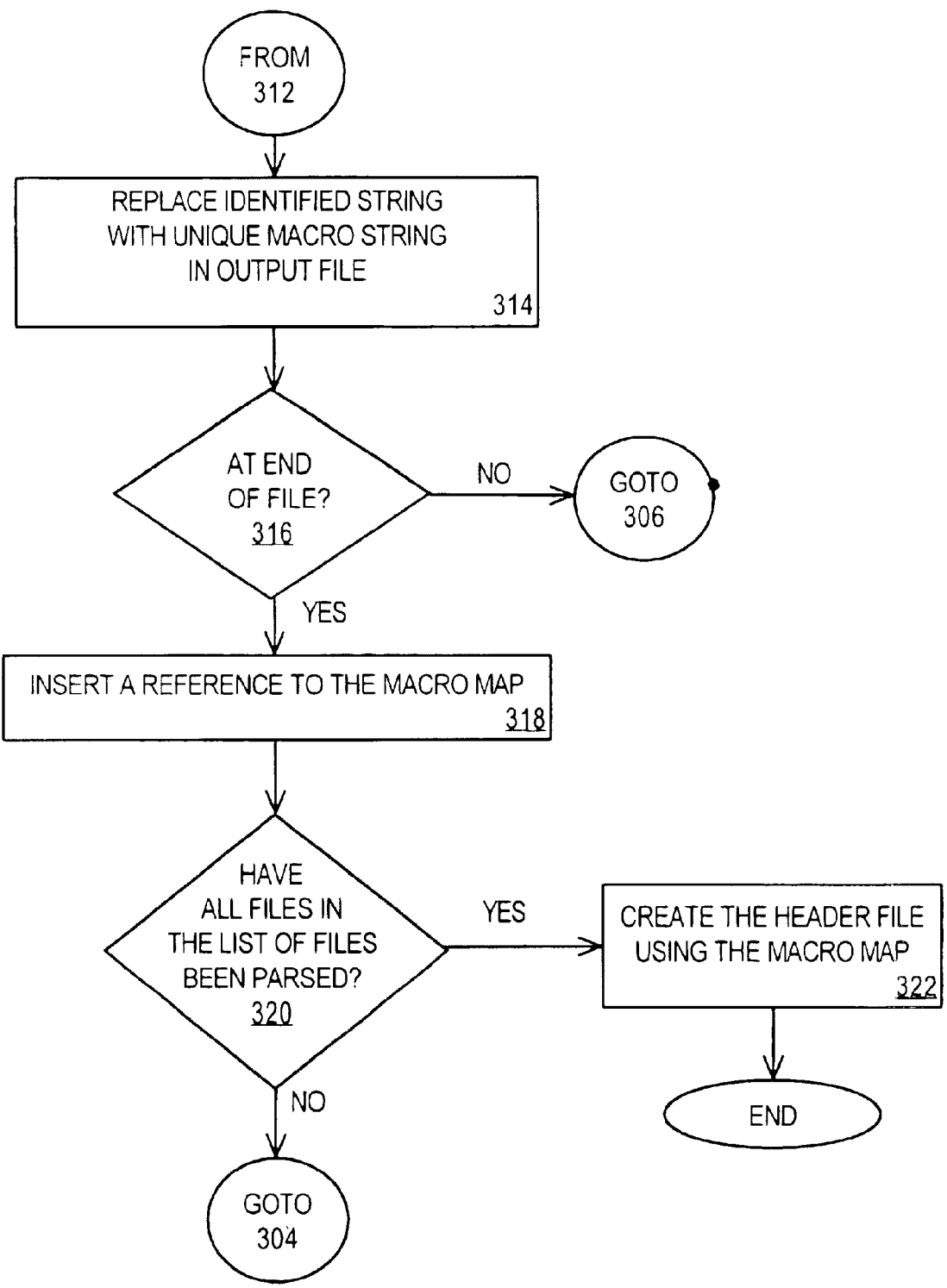
FIG. 3B is a flow diagram that illustrates further steps in the method of FIG. 3A.

FIG. 3A and FIG. 3B are flow diagrams that illustrate a method for transforming character strings that are contained in a unit of code. For explanation purposes, the steps of FIG. 3A and FIG. 3B will be explained with reference to the elements of FIG. 1 and FIG. 2.

At block 302, a list of one or more files that may contain hard coded string is located. For example, the list of files may be created and stored by making a list of one or more ".ccp" files that are contained in a particular directory of a file system. The list may be located by loading a pre-defined list of files. Alternatively, the list may be provided as a command line parameter. A list might contain information identifying input files 102, 104, 106 by file name or pathnarne.

In block 304, a file from the list of one or more files is selected for parsing. For example, input file 102 of FIG. 1 may be selected for parsing.

At block 306, the process parses the selected file to identify a hard coded string. In one embodiment, in identifying hard coded strings, the conversion mechanism ignores those strings that are contained in a comment or compiler directive statement within the selected file. Elements other than strings are copied from the selected file to an output file.

At block 308, in response to identifying a string, the process determines whether the string has been processed previously. The test of block 308 may involve determining whether an identified string is already in a list of identified strings. In one embodiment, a macro map is maintained that includes entries that map identified strings to unique macro strings. Using the macro map, the process can determine whether an identified string has previously been processed. If the identified string has been seen previously, control proceeds to block 314. However, if at block 308 the process determines that the identified string has not been processed previously, then at block 310, the process generates a unique macro string for the identified string.

At block 312, an entry is created in the macro map that maps the identified string to the newly generated unique macro string.

At block 314, the process replaces the identified string with the unique macro string in its output. For example, upon identifying string 118 ("abc") in input file 102, conversion mechanism 108 generates a unique macro string (Z0001), and replaces "abc" with Z0001, as illustrated by string 104 in output file 112.

At block 316, the process determines whether it has reached the end of the input file. If the file has not been completely parsed, control proceeds to block 306 to continue parsing the file for hard coded strings.

Alternatively, if the file has been completely parsed, then at block 318 the file is updated to include a reference to the macro map, or to a file that is created based upon the macro map. For example, as depicted in FIG. 1, file reference 134 is inserted into output file 112 to include a reference to an include file. The include file is based upon the contents of a macro list.

At block 320, the conversion mechanism determines whether additional files need to be parsed. If additional files do need to be parsed, then control proceeds to block 304 to select the next file for parsing.

Conversely, if no additional files need to be parsed, at block 322, the conversion mechanism uses the contents of the Macro map to create the include file. For example, using a macro map that includes information based on the hard coded strings identified in input files 102, 104 and 106, the conversion mechanism creates macro list 110 with macro definition entries 128, 130, 132.

General Processing Example

FIG. 4 a block diagram depicting a general processing sequence for substituting the string "abc" with the macro ABC according to one embodiment of the invention. At step 1, string conversion mechanism 400 parses A.cpp file 406. In parsing A.cpp file 406, string conversion mechanism 400 identifies the string "abc" as a hard coded character string within the source code. At step 2, in response to identifying string "abc", string conversion mechanism 400 queries macro map 404 to determine whether the string has already been included within the macro map. If the string has not already been included within the macro map 404, at step 3, conversion mechanism 400 generates a unique macro string (ABC) and causes the string "abc" and the macro string ABC to be entered into macro map 404.

At step 4, conversion mechanism 400 replaces the string "abc" with the macro string ABC within A.cpp file 410. In one embodiment, A.cpp file 406 and A.cpp file 410 represent the same file in that the updates are made directly to the file that is being parsed. In an alternative embodiment, A.cpp file 406 and A.cpp file 410 represent different files in which the contents of A.cpp file 406 is copied into A.cpp file 410 as A.cpp file 406 is parsed with the macro substitutions being made in A.cpp file 410. This allows A.cpp file 406 to remain unaffected by the string conversion process.

At step 5, conversion mechanism 400 updates A.cpp file 406 to reference X.h file 402. At step 6, conversion mechanism 400 creates the include file X.h 400 and at step 7 defines the macro 408 within include file X.h 400.

Component Block Diagram

FIG. 5 illustrates a block diagram of a String Conversion System 500 in accordance with certain embodiments of the invention. As depicted, String Conversion System 500 includes a Parser Module 502, Source Code File Manger Module 504, Macro Map Manager Module 506 and Header File Manager Module 508.

Source Code File Manger Module 504 is configured to perform the functions of:

(1) opening a .cpp file;
(2) reading the file and passing characters to the Parser;
(3) substituting macros for hard coded strings;
(4) determining whether the include statement is already contained in the .cpp;
(5) adding the include statement if necessary; and
(6) closing the .cpp file.

Parser Module 502 is configured to perform the functions of:

(1) parsing the .cpp file to identify hard coded strings;
(2) creating unique macros for each unique hard coded string that is identified; and
(3) passing the string and unique macro to the Source Code File Manger Module 504, Macro Map Manager Module 506 and Header File Manager Module 508.

Macro Map Manager Module 506 is configured to perform the functions of:

(1) determine whether the macro map already includes a macro for the identified string; and
(2) add the string and unique macro to the macro map if they are not already included.

Header File Manager Module 508 is configured to perform the functions of:

(1) creates the .h file if not already created;
(2) defines the macro in the .h file; and
(3) closes the .h file.

Comunicating Between Components

Figure 6A:
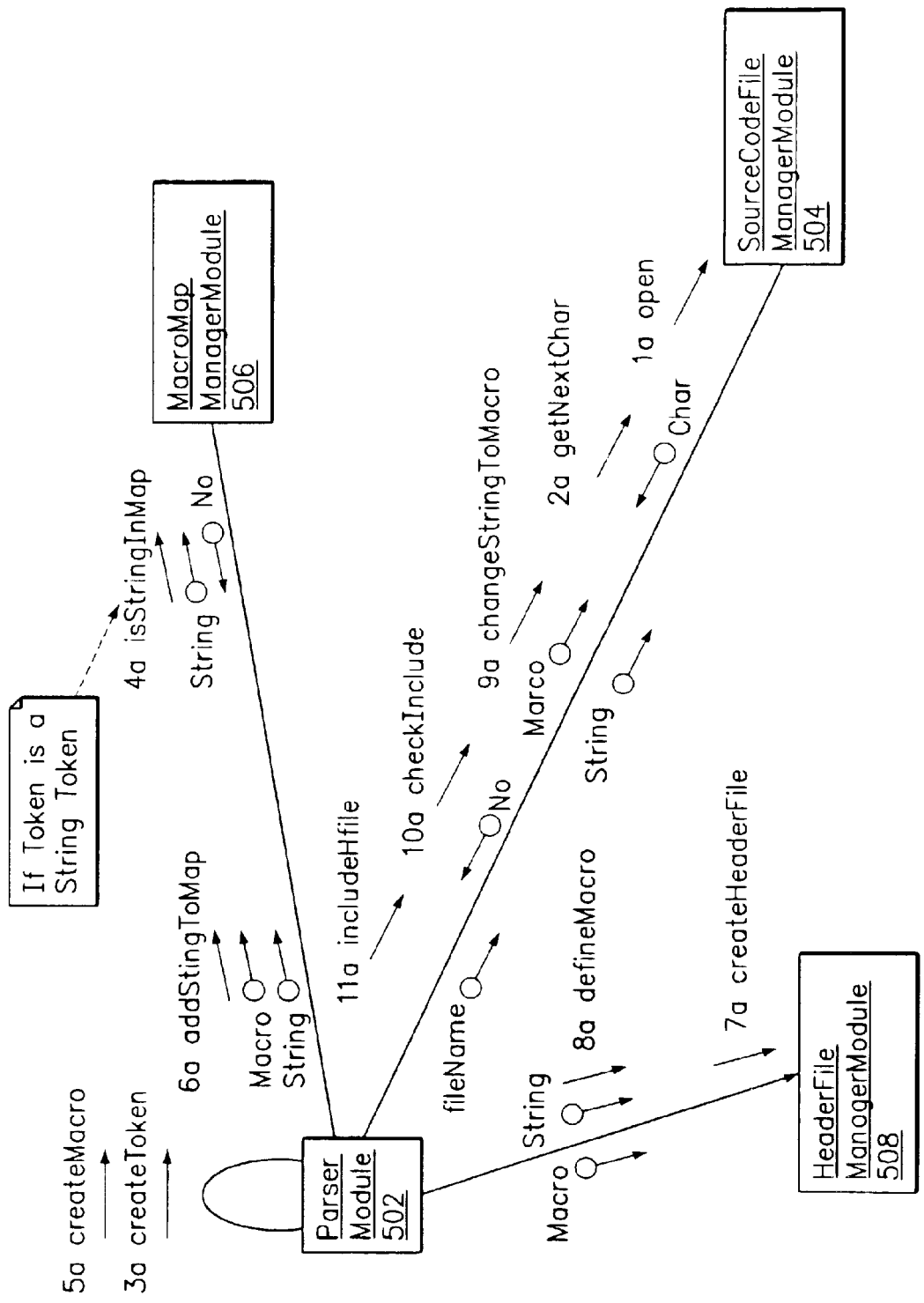
FIG. 6A is an example of a communication sequence that may be performed between the components of FIG. 5.
Figure 6B:
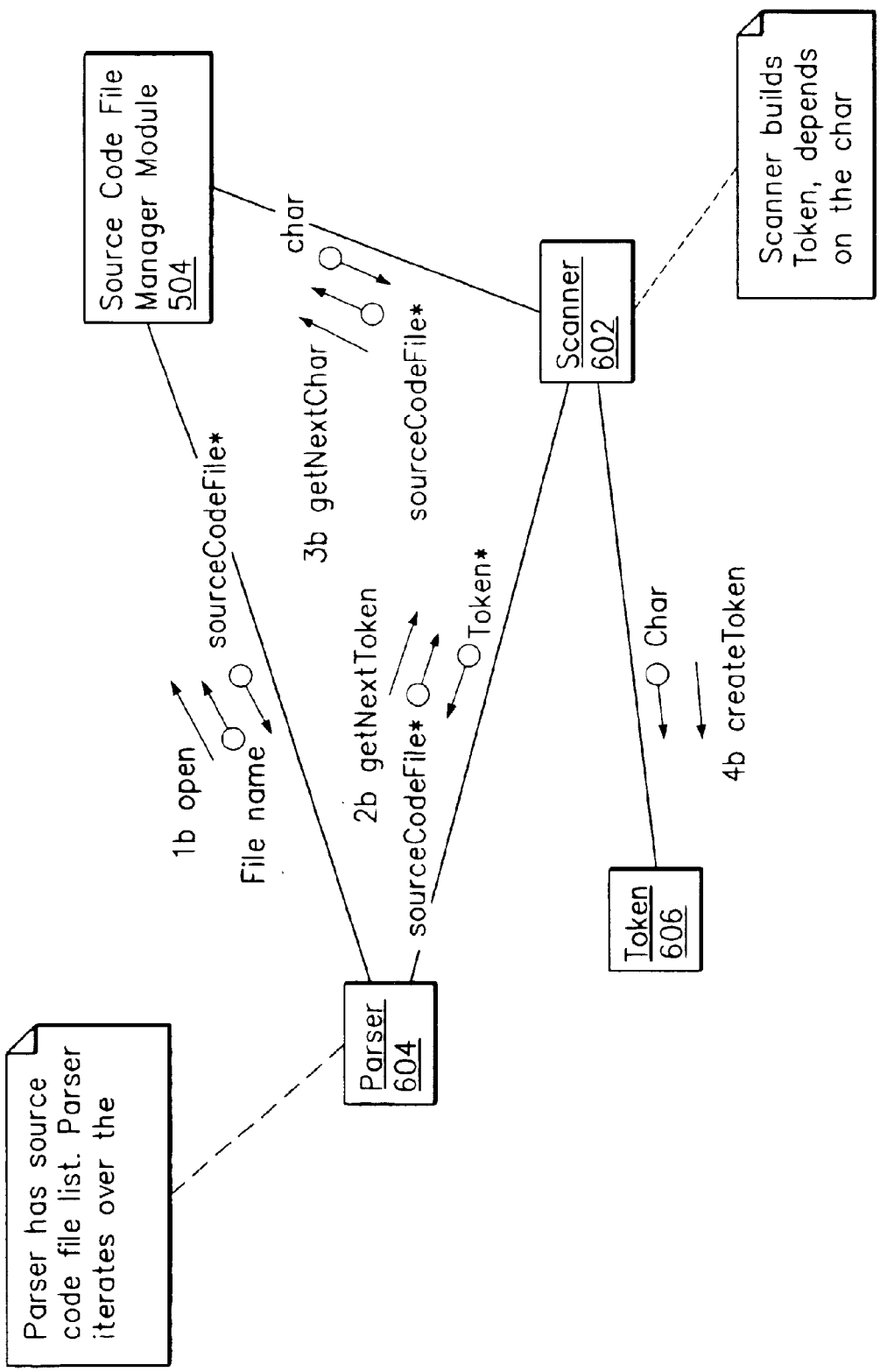
FIG. 6B illustrates another example of the communication sequence that may be performed between the components of FIG. 5.
Figure 6C:
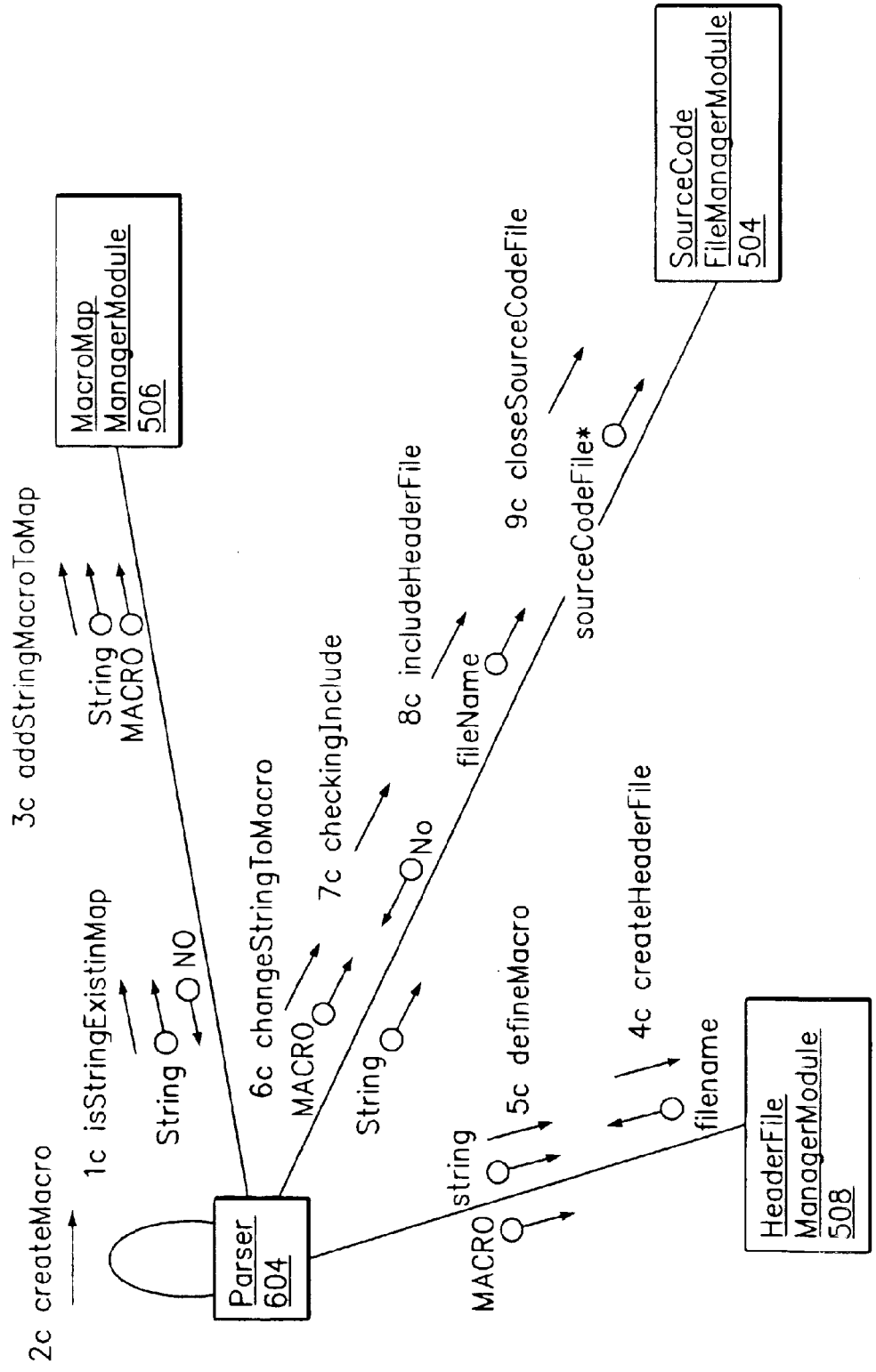
FIG. 6C illustrates another example of the communication sequence that may be performed between the components of FIG. 5.

FIGS. 6A, 6B and 6C illustrate an example of a communication sequence that may be performed between the components previously shown in FIG. 5. FIG. 6A illustrates a sequence of steps from opening a file to handling an identified token. As depicted in FIG. 6A, at step 1a, Parser Module 502 requests Source Code File Manager Module 504 to open a file by calling an "open" function of Source Code File Manager Module 504. After the file is successfully opened, as shown by step 2a, Parser Module 502 requests the Source Code File Manager Module 504 to return the next character by calling a "getNextChar" function. Once Parser Module 502 obtains the character, at step 3a, the character is compared to the delimiters to form a token by calling a "createToken" function. Steps 2a and 3a are repeated until the string with double quotes is identified. At the step 4a, parser Module 502 calls an "is StringInMap" function of Macro Map Manager Module 506, passing the identified string as part of the call. If the string is not found within the Macro Map 404 (FIG. 4), the "is StringInMap" function returns a flag ("NO") that indicates the string has not previously been seen. At step 5a, Parser Module 502 then calls a "createMacro" function to get the unique Macro. After obtaining the unique Macro, at step 6a, Parser Module 502 passes the unique Macro and the string to Macro Map Manager Module 506 by calling an "addStringToMap" function. At step 7a, if the header file does not exit, Parser Module 502 requests Header File Manager Module 508 to create the header file by calling a "createHeaderFile" function of Header File Manager Module 508. At step 8a, Parser Module passes the Macro and string to Header File Manager Module 508 to be added to the header file through a "defineMacro" function. At step 9a, Parser Module 502 directs Source Code File Manager Module 504 to replace the identified string with the Macro by calling a "changeString-ToMacro" function of Source Code File Manager Module 504. At step 10a, once the entire file is read, Parser Module 502 checks if the header file preprocessor directive (#include<xxx.h>) is included within the output file. If not, at step 11a, Parser Module 502 calls an "includeHeaderfile" function of Source code File Manager Module to modify the output file to include the preprocessor directive.

FIG. 6B shows the details of steps, 1a, 2a, and 3a of the FIG. 6A with the class structure within the Parser Module 502. Parser 604, Scanner 602 and Token 606 are classes within Parser Module 502. Step 1b of FIG. 6B is a detailed description of step 1a of FIG. 6A. As depicted in step 1b, Parser class object 604 makes a call to an "open" function of Source Code File Manager Module 504 using the file name as a parameter as previously illustrated in step 1a of FIG. 6A. After opening the file with the file name, Source Code File Manager Module 504 returns the file pointer. If the function fails to open the file, Source Code File Manager 504 returns a null pointer. Alternatively, if the file opening is successful (i.e., a non-null pointer is returned), at step 2b, Parser class object 604 requests the next token from Scanner class object 602 by passing the file pointer in a call to a "getNextToken" function of Scanner class object 602. Within the getNextToken function, Scanner class object 602 continues to request characters from Source Code File Manager Module 504 by repeatedly calling a "getNextChar" function until a token delimiter is encountered. Token 606 is used to assist Scanner class object 602 in creating a Token by calling the function "createToken". When the token delimiter is encountered, Scanner class object 602 creates a pointer to Token 606 and returns the pointer to the Parser class object 604 as a return value of the function "getNextToken" of step 2b. When the end of file is encountered, the EOF token is returned.

FIG. 6C is equivalent to steps 4b through 11b of FIG. 6A with certain internal details and file-closing steps added. When the "getNextToken" function returns the EOF token, denoting that the end of file is encountered, Parser class object 604 calls a "checkInclude" function of Source Code File Manager Module 504 as illustrated by step 7c. If a flag value of "NO" is returned, at step 8c, Parser class object 604 passes the .h file name to Source Code File Manager Module 504 via an "includeHeaderFile" function. At step 9c, Parser class object 604 closes the source code by passing the source code file pointer to Source Code File Manager Module 504.

Hardware Overview

Figure 7:
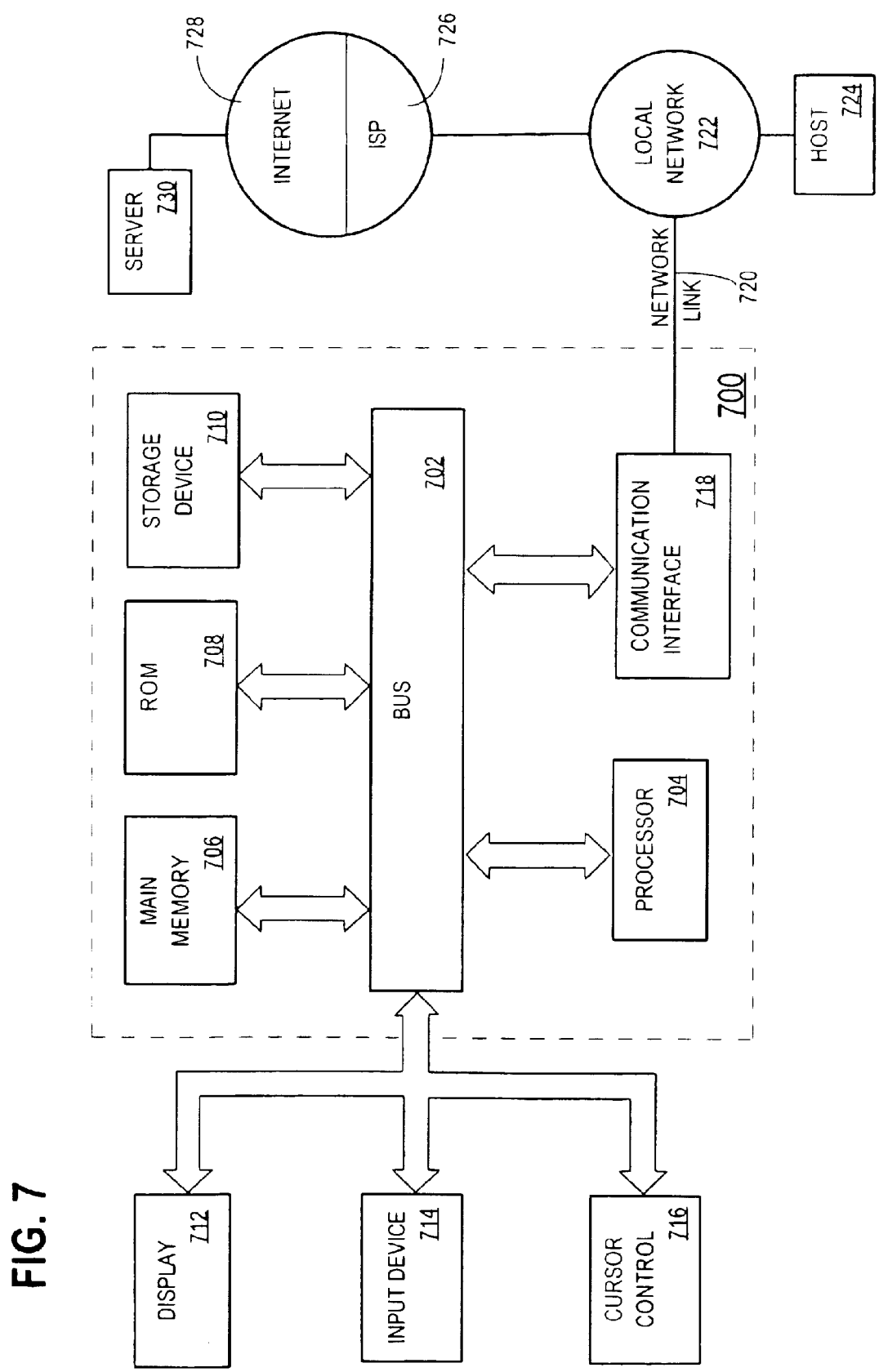
FIG. 7 is a block diagram of a computer system hardware arrangement that can be used to implement the invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for transforming character strings that are contained in a unit of code. According to one embodiment of the invention, character string transformation is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and conununication interface 718. In accordance with the invention, one such downloaded application provides for transforming character strings that are contained in a unit of code as described herein.

The received code may be executed by processor 704 as it is received, and/or stored in storage device 710, or other non-volatile storage for later execution. In this manner, computer system 700 may obtain application code in the form of a carrier wave.

Alternatives, Extensions

The conversion mechanism that is described herein provides a mechanism wherein a user can conveniently modify strings that are hard coded within a file. In particular, the conversion mechanism can reduce the negative effects that are inherent in software applications that includes hard coded strings and provides a mechanism in which hard coded visual information can be translated from one language to another.

In describing certain embodiments of the invention, several drawing figures have been used for explanation purposes. However, the invention is not limited to any particular context as shown in drawing figures, and the spirit and scope of the invention include other contexts and applications in which the distributed authorization model described herein is available to other mechanisms, methods, programs, and processes. For example, although output files 112, 114, and 116 are respectively depicted as separate files from input files 102, 104, 106, in certain embodiments, they may actually represent the same files. For example, in transforming the character strings, conversion mechanism may make the corresponding updates to input file 102, thus causing output file 112 and input file 102 to be the same file. Alternatively, the conversion mechanism may create a copy of input file 102, (output file 112) and make the corresponding updates to output file 112. Thus, the specification and drawings are, accordingly, to be regarded in an illustrative rather than a restrictive sense.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for transforming character strings that are contained in computer program source code the method comprising the computer-implemented steps of:

automatically parsing the computer program source code to identify a hard coded string that is both contained in the computer program source code and does not already have a corresponding macro string that is uniquely associated with the hard coded string; and in response to identifying a hard coded string that is both contained in the computer program source code and does not already have a corresponding macro string that is uniquely associated with the hard coded string, replacing the hard coded string contained in the computer program source code with a macro string that is uniquely associated with the hard coded string;

creating and storing in a mapping of macro strings to hard coded strings, an entry that defines an association between the hard coded string and the macro string that replaced the hard coded string; and generating and storing in the computer program source code a reference to the mapping of macros to strings.

2. The method as recited in claim 1, wherein the step of automatically parsing the computer program source code to identify a hard coded string includes:

identifying one or more computer program source code files that contain one or more hard coded strings; and automatically parsing at least one of the one or more computer program source code files to identify the one or more hard coded strings while copying instructions from at least one of the one or more computer program source code files to an output.

3. The method as recited in claim 1, further comprising the computer-implemented steps of:

receiving a suggested macro string for the identified hard coded string, and generating the macro string to replace the hard coded string contained in the computer program source code based upon the suggested macro string.

4. The method as recited in claim 1, further comprising the computer-implemented step of compiling the computer program source code to generate an executable, including substituting in the executable the hard coded string for each instance of the macro in the computer program source code.

5. The method as recited in claim 1, further comprising the computer-implemented steps of:

parsing the computer program source code to locate a second hard coded string contained therein, wherein the second hard coded string is different than the hard coded string;

in response to locating the second hard coded string contained in the computer program source code, determining whether a macro string was previously generated for the second hard coded string by searching the mapping; and generating a second macro string uniquely associated with the second hard coded string only when a macro string was not previously generated for the second hard coded string.

6. A method for transforming hard coded character strings that are contained in computer program source code the method comprising the computer-implemented steps of:

identifying a hard coded string that is contained in the computer program source code;

replacing the hard coded string contained in the computer program source code with a macro string that is uniquely associated with the hard coded string;

creating and storing in a macro file a macro definition that defines an association between the hard coded string and the macro string that replaced the hard coded string; and referencing the macro definition in the computer program source code using a compiler directive that causes a compiler to include the macro file during compilation of the computer program source code.

7. A computer-readable medium carrying one or more sequences of instructions for transforming character strings that are contained in computer program source code, wherein execution of the one or more sequences of instructions by one or more processors causes the one or more processors to perform:

automatically parsing the computer program source code to identify a hard coded string that is both contained in the computer program source code and does not already have a corresponding macro string that is uniquely associated with the hard coded string; and in response to identifying a hard coded string that is both contained in the computer program source code and does not already have a corresponding macro string that is uniquely associated with the hard coded string, replacing the hard coded macro string contained in the computer program source code with a macro that is uniquely associated with the hard coded string;

creating and storing in a mapping of macro strings to hard coded strings, an entry that defines an association between the hard coded string and the macro string that replaced the hard coded string; and generating and storing in the computer program source code a reference to the mapping of macros to strings.

8. The computer-readable medium as recited in claim 7, wherein the step of automatically parsing the computer program source code to identify a hard coded string includes:

identifying one or more computer program source code files that contain one or more hard coded strings; and automatically parsing at least one of the one or more computer program source code files to identify the one or more hard coded strings while copying instructions from at least one of the one or more computer program source code files to an output.

9. The computer-readable medium as recited in claim 7, further comprising the computer-implemented steps of:

receiving a suggested macro string for the identified hard coded string, and generating the macro string to replace the hard coded string contained in the computer program source code based upon the suggested macro string.

10. The computer-readable medium as recited in claim 7, further comprising the computer-implemented step of compiling the computer program source code to generate an executable, including substituting in the executable the hard coded string for each instance of the macro in the computer program source code.

11. The computer-readable medium as recited in claim 7, further comprising the computer-implemented steps of:

parsing the computer program source code to locate a second hard coded string contained therein, wherein the second hard coded string is different than the hard coded string;

in response to locating the second hard coded string contained in the computer program source code, determining whether a macro string was previously generated for the second hard coded string by searching the mapping; and generating a second macro string uniquely associated with the second hard coded string only when a macro string was not previously generated for the second hard coded string.

12. A computer system for transforming character strings that are contained in computer program source code stored in a memory, the computer system comprising:

one or more processors coupled to the memory;

a conversion mechanism;

a stored mapping that defines one or more associations between macros and strings;

one or more computer instructions contained in the memory and associated with the conversion mechanism which, when executed by the one or more processors, cause the one or more processors to perform the steps of:

automatically parsing the computer program source code to identify a hard coded string that is both contained in the computer program source code and does not already have a corresponding macro string that is uniquely associated with the hard coded string; and in response to identifying a hard coded string that is both contained in the computer program source code and does not already have a corresponding macro string that is uniquely associated with the hard coded string, replacing the hard coded string contained in the computer program source code with a macro string that is uniquely associated with the hard coded string;

creating and storing in the mapping that defines one or more associations between macro strings and hard coded strings, an entry that defines an association between the hard coded string and the macro string that replaced the hard coded string; and generating and storing in the computer program source code a reference to the mapping that defines one or more associations between macros and strings.

13. The computer system as recited in claim 12, wherein the step of automatically parsing the computer program source code to identify a hard coded string includes:

identifying one or more computer program source code files that contain one or more hard coded strings; and automatically parsing at least one of the one or more computer program source code files to identify the one or more hard coded strings while copying instructions from at least one of the one or more computer program source code files to an output.

14. The computer system as recited in claim 12, further comprising the computer-implemented steps of:

receiving a suggested macro string for the identified hard coded string, and generating the macro string to replace the hard coded string contained in the computer program source code based upon the suggested macro string.

15. The computer system as recited in claim 12, further comprising the computer-implemented step of compiling the computer program source code to generate an executable, including substituting in the executable the hard coded string for each instance of the macro in the computer program source code.

16. The computer system as recited in claim 12, further comprising the computer-implemented steps of: parsing the computer program source code to locate a second hard coded string contained therein, wherein the second hard coded string is different than the hard coded string;

in response to locating the second hard coded string contained in the computer program source code, determining whether a macro string was previously generated for the second hard coded string by searching the mapping; and generating a second macro string uniquely associated with the second hard coded string only when a macro string was not previously generated for the second hard coded string.

17. A computer-readable medium carrying one or more sequences of instructions for transforming hard coded character strings that are contained in computer program source code, wherein execution of the one or more sequences of instructions by one or more processors causes the one or more processors to perform the steps of:

identifying a hard coded string that is contained in the computer program source code;

replacing the hard coded string in the computer program source code with a macro string that is uniquely associated with the hard coded string;

creating and storing in a macro file a macro definition that defines an association between the hard coded string the macro string that replaced the hard coded string; and referencing the macro definition in the computer program using a compiler directive that causes a compiler to include the macro file during compilation of the computer program source code.

18. An apparatus for transforming hard coded character strings that are contained in computer program source code, the apparatus comprising a memory carrying one or more sequences of instructions which, when executed by one or more processors causes the one or more processors to perform the steps of:

identifying a hard coded string that is contained in the computer program source code;

replacing the hard coded string contained in the computer program source code with a macro string that is uniquely associated with the hard coded string;

creating and storing in a macro file a macro definition that defines an association between the hard coded string and the macro string that replaced the hard coded string; and referencing the macro definition in the computer program source code using a compiler directive that causes a compiler to include the macro file during compilation of the computer program source code.

* * * * *

UNITED STATES PATENT AND TRADEMARK OFFICE
CERTIFICATE OF CORRECTION

PATENT NO. : 6,802,059 B1
DATED : October 5, 2004
INVENTOR(S) : Yevgeniya Lyapustina et al.

It is certified that error appears in the above-identified patent and that said Letters Patent is hereby corrected as shown below:

Title page,
Item [73], Assignee, "Ricoh Corporation, San Jose, California" should read -- Ricoh Corporation, San Jose, Californina; Ricoh Company, Tokyo, Japan --.

Signed and Sealed this

Eighteenth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,802,059 B1
DATED : October 5, 2004
INVENTOR(S) : Yevgeniya Lyapustina et al.

It is certified that error appears in the above-identified patent and that said Letters Patent is hereby corrected as shown below:

Title page,
Item [73], Assignee, "Ricoh Corporation, San Jose, California" should read -- Ricoh Corporation, San Jose, California; Ricoh Company, Ltd., Tokyo, Japan --.

This certificate supersedes Certificate of Correction issued January 18, 2005.

Signed and Sealed this

Twenty-fifth Day of May, 2005

JON W. DUDAS
*Director of the United States Patent and Trademark Office*